US000002008B1

(19) United States

(12) Statutory Invention Registration

Johnson

(10) Reg. No.: US H2008 H

(43) Published: Jan. 1, 2002

(54) FOOD FLAGGING DEVICE AND METHOD OF USE THEREOF

(75) Inventor: Mark R. Johnson, Concord, CA (US)

(73) Assignee: Chevron Products Company, a division of Chevron U.S.A. Inc., San Francisco, CA (US)

(21) Appl. No.: 09/251,926

(22) Filed: Feb. 17, 1999

(51) Int. Cl.[7] ..... G09F 17/00

(52) U.S. Cl. ..... 116/173; 116/175

(58) Field of Search ..... 116/173

(56) References Cited

U.S. PATENT DOCUMENTS 4,516,485 A 5/1985 Miller ..... 99/339

*Primary Examiner*—Daniel T. Pihulic

(74) *Attorney, Agent, or Firm*—W. Keith Turner; Ernest A. Schaal

(57) ABSTRACT

A food flagging device has a flag stem, a time identification means, a magnet support platform, and a magnetic means. The time identification means is either attached to, or is contained within, the flag stem. The magnet support platform is either attached to, or is contiguous with, the flag stem. The magnetic means is attached to the magnet support platform and has a magnetic field that is sufficiently strong to hold the food flagging device to a stainless steel surface. The food flagging device is heat-resistant and is capable of being sanitized.

16 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FOOD FLAGGING DEVICE AND METHOD OF USE THEREOF

The present invention relates to a flagging device useful in monitoring the time that a food item has been on a grill, and a method of using that flagging device.

BACKGROUND OF THE INVENTION

Sausages and hot dogs are widely known and consumed foodstuffs that have been adapted to informal and fast service food preparation and sale. In particular, Americans are well known for eating of hot dogs, usually served by preparing sausages and buns and inserting the sausages into the buns.

As fast service restaurants have developed in the United States, attention has been turned toward improved methods and apparatus for preparing foodstuffs, including hot dogs. Grill apparatus of varying kinds, including heated rollers and rotisserie structures have been developed and used in efforts to meet requirements for fast food service of sausages and buns, such as hot dogs in buns.

Representative of one such grill apparatus is the device disclosed in U.S. Pat. No. 4,516,485, titled "Device for Cooking Food," which is herein incorporated by reference for all purposes.

In the making and retailing of grilled food items, a common problem is quality assurance.

Food grill systems often have two grills. One grill is for cooking the foods, and the other grill is to keep food warm at a lower temperature. Food is usually cooked in batches every hour, every three hours, depending on business.

For instance, in the making and selling of hot dogs, one must be concerned about how long a hot dog has been on a grill, waiting to be sold. Normally it only takes twenty minutes to cook a hot dog, then the hot dog is placed on a warm grill. If the hot dog remains on the grill too long, it becomes unappealing in look and texture. The texture becomes tough, the hot dog loses flavor, and the hot dog becomes hard to bite. After about 4 hours, the hot dog is no longer considered edible. Taste tests have revealed that the hot dogs should be dumped after three hours on a warming grill.

The problem is keeping track of how long a food item has been on a grill. In a busy retail environment it is hard to keep track of which food items were placed upon the grill at what time. An object of this invention to provide a means for monitoring the time that a food item has remained on a grill system.

While cardboard markers have been used to monitor the time that a food item has been in a storage bin, those cardboard markers would not be of use in monitoring the time that a food item has been on a grill.

SUMMARY OF THE INVENTION

The present invention provides a food flagging device useful for monitoring the time that a food item has remained on a grill system, such as a rotary grill system. The food flagging device comprises a flag stem having a time identification means that is attached thereto or is containing therein, a magnet support platform that is either attached to or is contiguous with the flag stem, and a magnetic means attached to the magnet support platform.

The magnetic means has a magnetic field that is sufficiently strong to hold the food flagging device to a metallic surface, such as stainless steel. The food flagging device, and its separate components, needs to be heat-resistant and capable of being sanitized.

Preferably, the flag stem is made of either stainless steel or plastic.

Preferably, the time identification means is a numeric identification means having an integer number of from 1 to 12. Preferably, that time identification means is engraved into the flag stem.

Preferably, the magnet support platform is contiguous with the flag stem, and the magnet support platform is made of either stainless steel or plastic.

Preferably, the magnetic means is attached to the magnet support platform by means of a heat-resistant, water-resistant adhesive.

In the preferred method for using this food flagging device, a food item is placed upon a grill system and the food flagging device is placed near that food item and identifies the latest time the food item should be removed from the grill system. Then the food item is removed from the grill system either before or at that identified time.

In an alternative method, a food item is placed upon a grill system and the food flagging device is placed near that food item and identifies the time the food item was placed upon the grill system. Then the food item is removed from the grill system by a time that is the sum of the time identified by the food flagging device and the maximum time that the food item should remain on the grill system.

In either embodiment, preferably the food flagging device is placed between the food item and other food items that are either previously placed or to be placed upon the grill system.

Preferably, the food item is a hot dog that has already been cooked. Such cooked hot dogs should not remain on the grill for more than three hours from the time the hot dog was placed upon the grill.

BRIEF DESCRIPTION OF THE DRAWINGS

In order to assist the understanding of this invention, reference will now be made to the appended drawings. The drawings are exemplary only, and should not be construed as limiting the invention.

DETAILED DESCRIPTION OF THE INVENTION

Figure 1:
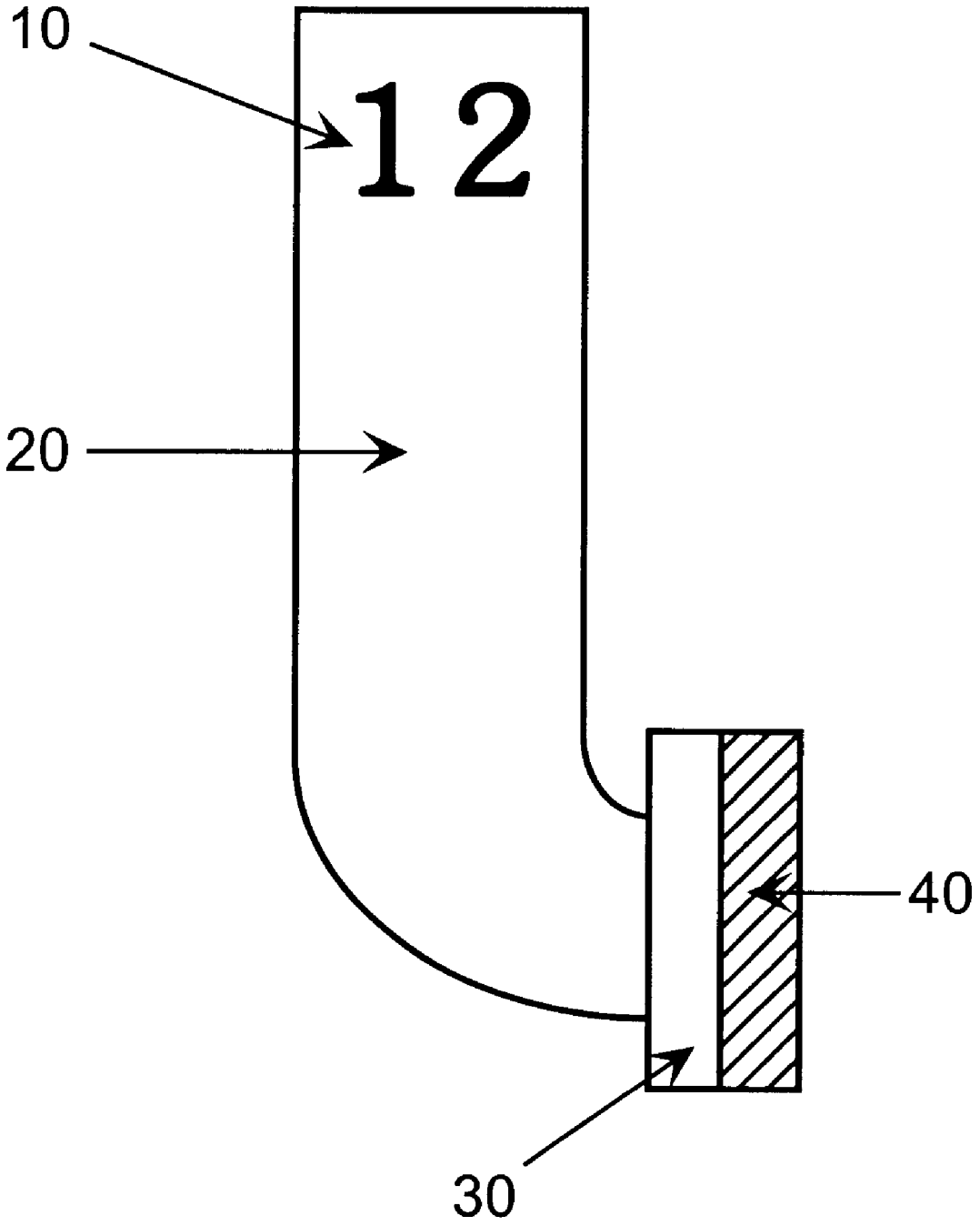
FIG. 1 is a front view of one embodiment of the present invention, a food flagging device wherein the magnet support platform is attached to flag stem.

In its broadest aspect, the present invention involves a food flagging device useful for monitoring the time that a food item remains on a grill system.

The food flagging device comprises a flag stem having attached thereto, or containing therein, a time identification means; a magnet support platform that is either attached to, or is contiguous with, the flag stem; and a magnetic means attached to the magnet support platform. The magnetic means has a magnetic field that is sufficiently strong to hold the food flagging device to a metallic surface, such as stainless steel.

The food flagging device needs to be heat-resistant and needs to be capable of being sanitized. That food flagging device, and its separate components, must be heat-resistant because it will be subjected to high temperatures from the rotary grill. That food flagging device, and its separate components, must be capable of being sanitized because it will be used in close proximity to food items.

THE FLAG STEM

The flag stem serves to flag which food items should be taken off a rotary grill by a particular time. Preferably, that flag stem is made of plastic or stainless steel.

The flag stem can be in any of a variety of shapes, but a preferred shape would be an elongated rectangle, with the long side being vertical. This shape is preferred because it is easy to manufacture and because it would fit compactly in the rotary grill system.

Preferably, the flag stem is of a color that is readily distinguishable from that of the grill system, but the color of the flag stem should not be so strikingly different that it piques the curiosity of customers.

A time identification means is either attached to this flag stem or contained within this flag stem. That time identification means identifies a time associated with a food item. In a preferred embodiment, that time is the latest time that the food item should be removed from a grill system. In another embodiment, that time is the time that the food item was placed upon a grill system. Other times might be used.

The time identification means can be attached to the flag stem by any means that is heat resistant and is capable of being sanitized. For example, the time identification means can be attached by a heat resistant and water-resistant adhesive. Preferably, the time identification means is contained within this flag stem, most preferably by engraving that time identification means into the flag stem.

In one embodiment, the time identification means can have the numbers 1 to 12, or 1:00 to 12:00, or other sets of symbols representing time, and some pointing device pointing to the particular time to be identified. In a specific instance of this embodiment, the symbols representing time are arranged on a wheel and the pointing device is a stationary cover that has a window exposing part of the wheel. In that specific instance, the wheel is turned until the particular time to be identified is revealed in the window of the cover. In another specific instance, the symbols representing time are arranged in a circle on the flag stem, and the pointing device rotates to identify the particular time to be identified.

Figure 3:
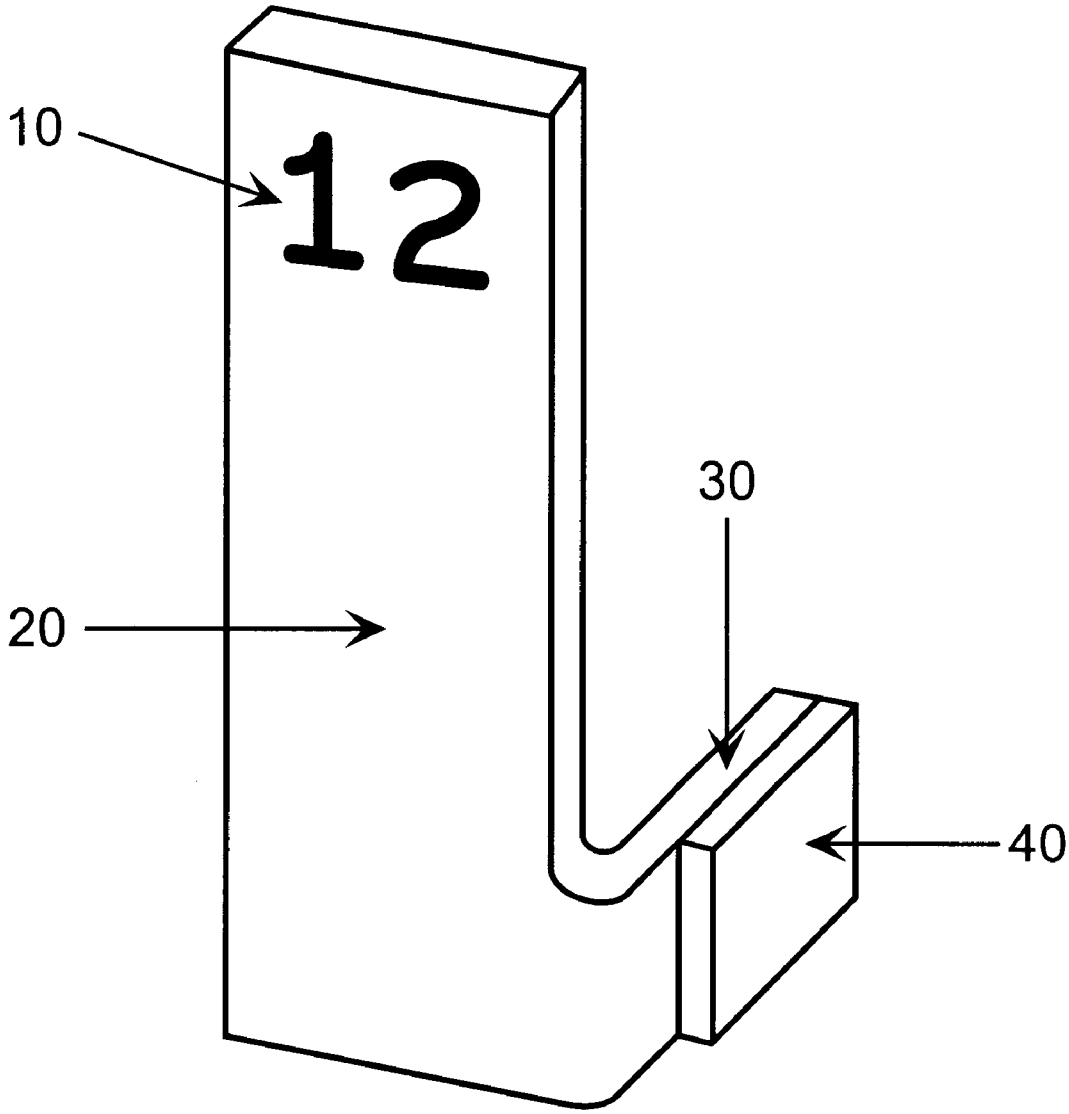
FIG. 3 is a perspective view of a second embodiment of the present invention, a food flagging device wherein the magnet support platform is contiguous with the bottom of flag stem.

The time identification means can be any type of means useful for identifying a time. Preferably, it can be an alphanumeric identification means, most preferably a numeric identification means. For example, the time of noon might be identified by the following: "noon," or "twelve," or "12:00," or "12," or by a symbol representing a clock showing the time 12:00. Most preferably, the time identification means is a numeric identification means having an integer number of from 1 to 12, so that a time of noon would be represented by the integer 12, as shown in FIGS. 1 and 3.

THE MAGNET SUPPORT PLATFORM

The magnet support platform serves to attach the magnetic means to the flag stem. That magnet support platform must have sufficient surface area to provide support for the magnetic means. The magnet support platform is preferably contiguous with the flag stem or it may be attached to the flag stem. Preferably, the magnet support platform is made of either stainless steel or plastic.

Preferably, the magnet support platform and the flag stem form a perpendicular angle, but other angles are acceptable, including an angle of 0° (both the magnet support platform and the flag stem being in the same plane). A perpendicular angle is preferred because, since the magnetic means and the magnet support platform are usually in planes parallel to that of one of the grill walls, that would cause the flag stem to be perpendicular to the grill wall. This would increase the visibility of the flag stem and the time identification means associated with that flag stem.

THE MAGNETIC MEANS

The magnetic means serves to attach the food flagging device to a metallic surface. The magnetic means is attached to the magnet support platform. That magnetic means must have a magnetic field that is sufficiently strong to hold the food flagging device to a metallic surface. The magnetic means can be attached to the magnet support platform by any means that would provide adequate attachment, while being heat-resistant and being capable of being sanitized. Preferably, the magnetic means is attached to the magnet support platform by means of a heat-resistant, water-resistant adhesive.

THE METHOD OF USE

The food flagging device of the present invention can be used in a method for monitoring the time that a food item has been on a grill. The food item can be any type of food item that would be placed upon a grill to keep warm (hamburger, sausage, hot dog, etc.). Preferably, the food item is a hot dog that has been cooked.

In that method, a food item is placed upon a grill system, preferably a rotary grill system. The food flagging device is placed near the food item to identify a time associated with the food item, and the food item is removed from the grill system based upon that time.

If the time associated with the food item is the latest time the food item should be removed from the grill system, the food item is removed by that time. If the time associated with the food item is the time the food item was placed upon the grill system, the food item is removed no later than the sum of that time identified and the maximum time that the food item should remain on the grill system. Preferably, the time associated with the food item is the latest time the food item should be removed from the grill system. For hot dogs, the maximum time that the food item should remain on the grill is three hours.

In placing the food flagging device in the proximity of the food item, preferably the food flagging device is placed between the food item and other food items placed on the grill at different times. For instance, it can be placed near the separation point between the new food item and previously placed food items, or it can be placed near the separation point between the new food item and where additional food items will be placed upon the grill system.

Referring to FIG. 1, the food flagging device comprises a flag stem 20 having engraved therein a time identification means 10. Attached to the bottom of the flag stem 20 is a magnet support platform 30. Attached to the magnet support platform 30 is the magnetic means 40.

Figure 2:
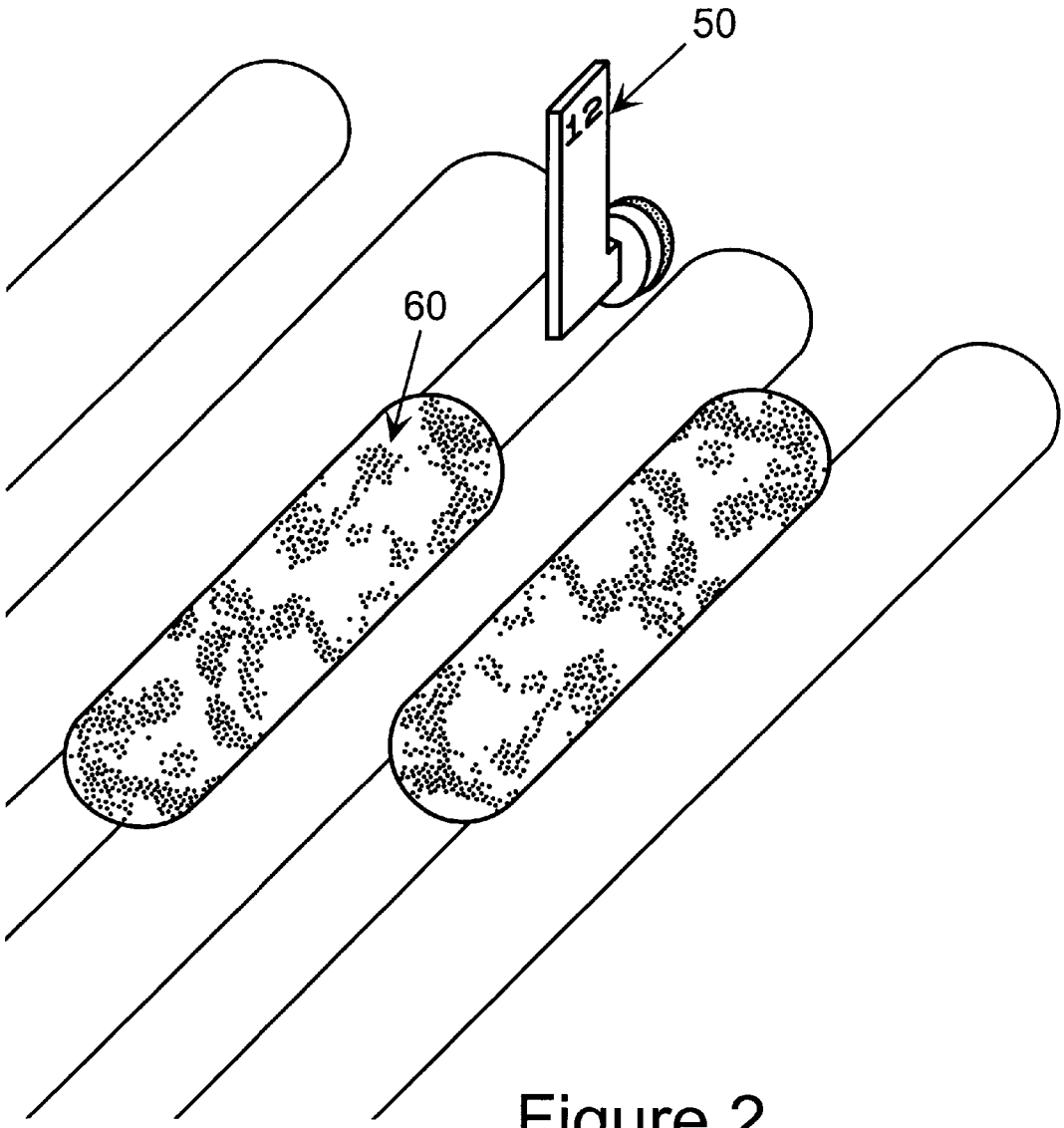
FIG. 2 is a perspective view of how the food flagging device shown in FIG. 1 can be placed in proximity to food items in a grill.

Referring to FIG. 2, the food flagging device 50 is placed upon a grill within close proximity to the food item 60 whose time it identifies.

Referring to FIG. 3, in an alternative embodiment, the food flagging device comprises a flag stem 20 having engraved therein a time identification means 10. Contiguous with the bottom of the flag stem 20 is a magnet support platform 30. Attached to the magnet support platform 30 is the magnetic means 40.

While the present invention has been described with reference to specific embodiments, this application is intended to cover those various changes and substitutions that may be made by those skilled in the art without departing from the spirit and scope of the appended claims.

What is claimed is:

1. A food flagging device comprising:

a. a flag stem having attached thereto, or containing therein, a time identification means;

b. a magnet support platform that is either attached to, or is contiguous with, said flag stem; and c. a magnetic means attached to said magnet support platform, wherein said magnetic means has a magnetic field that is sufficiently strong to hold said food flagging device to a metallic surface;

wherein the food flagging device is heat-resistant and capable of being sanitized.

2. A food flagging device according to claim 1 wherein said time identification means is a numeric identification means having an integer number of from 1 to 12.

3. A food flagging device according to claim 1 wherein said time identification means is engraved into said flag stem.

4. A food flagging device according to claim 1 wherein said flag stem and said magnet support platform are both made of a material selected from the group consisting of stainless steel and plastic.

5. A food flagging device according to claim 1 wherein said magnet support platform is contiguous with said flag stem.

6. A food flagging device according to claim 1 wherein said magnetic means is attached to said magnet support platform by means of a heat-resistant, water-resistant adhesive.

7. A method for using said food flagging device according to claim 1, said method comprising the steps of:

a. placing a food item upon a grill system;

b. placing said food flagging device in the proximity of said food item to identify the latest time that said food item should be removed from said grill system; and c. removing said food item from said grill system at a time no later than the time identified by said food flagging device.

8. A method according to claim 7 wherein said food flagging device is placed between said food item and other food items, either previously placed or to be placed upon said grill system.

9. A method according to claim 7 wherein said food item is a hot dog that has been cooked, and said grill system is a rotary grill system.

10. A method according to claim 9 wherein said time associated with said hot dog is no later than three hours from the time said hot dog was placed upon said rotary grill.

11. A method for using said food flagging device according to claim 1, said method comprising the steps of:

a. placing a food item upon a grill system;

b. placing said food flagging device in the proximity of said food item to identify the time said food item was placed upon said grill system; and c. removing said food item from said grill system at a time no later than the sum of the time identified by said food flagging device and a maximum time that said food item should remain on said grill system.

12. A method according to claim 11 wherein said food flagging device is placed between said food item and other food items, either previously placed or to be placed upon said grill system.

13. A method according to claim 11 wherein said food item is a hot dog that has been cooked, and said grill system is a rotary grill system.

14. A method according to claim 13 wherein said maximum time that said hot dog should remain on said rotary grill system is no longer than three hours.

15. A hot dog flagging device comprising:

a. a flag stem made of a material selected from the group consisting of stainless steel and plastic, wherein said flag stem has engraved therein a time identification means, and wherein said time identification means is a numeric identification means having an integer number of from 1 to 12;

b. a magnet support platform made of a material selected from the group consisting of stainless steel and plastic, wherein said magnet support platform is contiguous with said flag stem; and c. a magnetic means attached to said magnet support platform by means of a heat-resistant, water-resistant adhesive, wherein said magnetic means has a magnetic field that is sufficiently strong to hold said food flagging device to a stainless steel surface;

wherein the hot dog flagging device is heat-resistant and is capable of being sanitized.

16. A method for using said hot dog flagging device according to claim 15, said method comprising the steps of:

a. placing a cooked hot dog upon a rotary grill system;

b. placing said hot dog flagging device in the proximity of said cooked hot dog, between said cooked hot dog and other hot dogs, either previously placed or to be placed upon said grill system, so as to identify the latest time said cooked hot dog should be removed from said grill system, wherein said identified time is no later than three hours from the time said cooked hot dog was placed upon said grill; and c. removing said cooked hot dog from said grill system at a time no later than the time identified by said hot dog flagging device.

* * * * *